(12) United States Patent
Mei et al.

(10) Patent No.: US 10,271,049 B1
(45) Date of Patent: Apr. 23, 2019

(54) CONTROL METHODS OF SAMPLE ADAPTIVE OFFSET (SAO) FILTERING AND RELATED IMAGE PROCESSING SYSTEMS THEREOF

(71) Applicant: Shanghai Zhaoxin Semiconductor Co., Ltd., Shanghai (CN)

(72) Inventors: Ao Mei, Shanghai (CN); ChuanChuan Zhu, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 31 days.

(21) Appl. No.: 15/823,281

(22) Filed: Nov. 27, 2017

(30) Foreign Application Priority Data

Sep. 30, 2017 (CN) .......................... 2017 1 0915800

(51) Int. Cl.
*H04N 19/00* (2014.01)
*H04N 19/117* (2014.01)
*H04N 19/96* (2014.01)
*H04N 19/82* (2014.01)
*H04N 19/177* (2014.01)

(52) U.S. Cl.
CPC ......... *H04N 19/117* (2014.11); *H04N 19/177* (2014.11); *H04N 19/82* (2014.11); *H04N 19/96* (2014.11)

(58) Field of Classification Search
CPC .... H04N 19/117; H04N 19/177; H04N 19/82; H04N 19/96
See application file for complete search history.

(56) References Cited

U.S. PATENT DOCUMENTS

| | | | |
|---|---|---|---|
| 2014/0301489 A1* | 10/2014 | Laroche | H04N 19/85 375/240.29 |
| 2015/0181214 A1* | 6/2015 | Alshina | H04N 19/103 375/240.02 |
| 2017/0019668 A1* | 1/2017 | Morigami | H04N 19/176 |
| 2017/0318289 A1* | 11/2017 | Choi | H04N 19/176 |

* cited by examiner

*Primary Examiner* — Zhihan Zhou
(74) *Attorney, Agent, or Firm* — McClure, Qualey & Rodack, LLP

(57) ABSTRACT

Control methods of sample adaptive offset (SAO) filtering applied to an image processing system with an SAO filter are provided. The method includes the steps of: receiving video signal, wherein the video signal includes at least one group of picture (GOP) and the GOP has multiple frames, each having multiple coding tree units (CTUs); determining whether current frame is an intra-picture frame (I frame); turning on the SAO filter in response to determining that the current frame is the I frame to enable the SAO filter to perform an SAO filtering on the current frame and determining a CTU ratio of the CTUs being not performed with the SAO filtering for the current frame; and selectively turning off the SAO filter based on the CTU ratio, such that the SAO filter does not perform the SAO filtering on subsequent non-I frames in the GOP including the current frame.

14 Claims, 4 Drawing Sheets

CONTROL METHODS OF SAMPLE ADAPTIVE OFFSET (SAO) FILTERING AND RELATED IMAGE PROCESSING SYSTEMS THEREOF

CROSS REFERENCE TO RELATED APPLICATIONS

This Application claims priority of China Application No. 201710915800.X, filed on Sep. 30, 2017, and the entirety of which is incorporated by reference herein.

BACKGROUND OF THE INVENTION

Field of the Invention

The invention generally relates to image processing, and more particularly, to control methods of sample adaptive offset (SAO) filtering and image processing systems thereof.

Description of the Related Art

High Efficiency Video Coding (HEVC) is the latest generation of video coding standard released in recent years. Compared with the existing video coding standards such as H.264, HEVC has greater compression ratio and flexibility. In comparison to H.264, HEVC can save half the bit rate. Sample Adaptive Offset (SAO) filtering is a new adopted technique in HEVC, located after the deblocking filter (DBK) and also belonging to codec in-loop filter and used to compensate the losses caused by encoding quantization, to obtain results closer to the original samples and reduce distortion between the original images and reconstructed images, thus achieving better coding efficiency and the improvement of video quality.

However, the discrete cosine transform (DCT) is still used in HEVC standard, to quantize the conversion coefficients. Due to the quantization distortion of the high frequency AC coefficients, after decoding ripples will be produced at the edge of the image transform block, this distortion called the ringing effect. The cause for this phenomenon is the loss of high-frequency information; so, in order to lessen the ringing effect, it is necessary to reduce the loss of high-frequency component information. However, reducing the loss of high frequency component information by decreasing the quantization step size will reduce the compression rate. With SAO technique, some pixels can be compensated in the pixel domain, which can effectively lessen the ringing effect, not only increasing the peak signal to noise ratio (PSNR) of coding, but also reducing the encoding rate to a certain extent.

BRIEF SUMMARY OF THE INVENTION

Image processing systems and associated control methods of sample adaptive offset (SAO) filtering using the same are provided.

In an exemplary embodiment, a control method of sample adaptive offset (SAO) filtering applied to an image processing system with an SAO filter is provided. The method includes the steps of: receiving a video signal, wherein the video signal includes at least one group of picture (GOP) and the GOP has a plurality of frames, each of which having a plurality of coding tree units (CTUs); determining whether current frame is an intra-picture frame (I frame); turning on the SAO filter to enable the SAO filter to perform an SAO filtering on the current frame and determining a CTU ratio of the CTUs being not performed with the SAO filtering for the current frame in response to determining that the current frame is the I frame; and selectively turning off the SAO filter from next non-I frame based on the CTU ratio, such that the SAO filter does not perform the SAO filtering on subsequent non-I frames in the GOP including the current frame.

Another exemplary embodiment of an image processing system at least comprises an image input device, a sample adaptive offset (SAO) On/Off control device, a de-blocking filter and an SAO filter. The image input device obtains a video signal, wherein the video signal includes at least one group of picture (GOP) and the GOP has a plurality of frames, each of which having a plurality of coding tree units (CTUs). The SAO On/Off control device is connected to the image input device. The de-blocking filter is coupled to the SAO On/Off control device. The SAO filter is connected to the de-blocking filter for performing an SAO filtering, wherein the SAO On/Off control device receives the video signal, determines whether current frame is an intra-picture frame (I frame), turns on the SAO filter to enable the SAO filter to perform the SAO filtering on the current frame and determines a CTU ratio of the CTUs being not performed with the SAO filtering for the current frame in response to determining that the current frame is the I frame, and selectively turns off the SAO filter from next non-I frame based on the CTU ratio, such that the SAO filter does not perform the SAO filtering on subsequent non-I frames in the GOP including the current frame.

Methods disclosed above may be practiced by the disclosed apparatuses or systems which are hardware or firmware capable of performing particular functions and may take the form of program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. It should be understood that the embodiments may be realized in software, hardware, firmware, or any combination thereof.

In current HEVC encoder, once the SAO filter on the slice layer is turned on for loop filtering, all CTUs of a frame are going to encode the corresponding SAO syntax elements, even though some CTUs do not perform SAO filtering finally. If it appears that relatively fewer CTUs performing SAO filtering for intra frame (I frame), it may also appear that relatively fewer CTUs performing SAO filtering in the consequent frames. In this case, while the SAO filter is still turned on, peak signal to noise (PSNR) of video coding increases very slightly and it is still necessary to encode SAO syntax elements for each CTU. Therefore, the code rate of video coding increases more greatly than PSNR.

Accordingly, in order to solve aforementioned problems, embodiments of the invention provide an image processing system and control methods of sample adaptive offset (SAO) filtering thereof, such that for some high-definition videos with large resolution in which each frame contains a large number of CTUs, if relatively fewer CTUs are selected for SAO in current frame after SAO mode selection, it is not necessary to turn on SAO filter for subsequent non-I frames. The system of the invention can make it possible to turn off the SAO filter adaptively in such a case and then adaptively turn on the SAO filter for subsequent I-frames or scene-switching frames, to reduce the time complexity of coding and the coding of SAO syntax elements to a certain extent without lowering coding quality, thus effectively saving the code rate.

Figure 1:
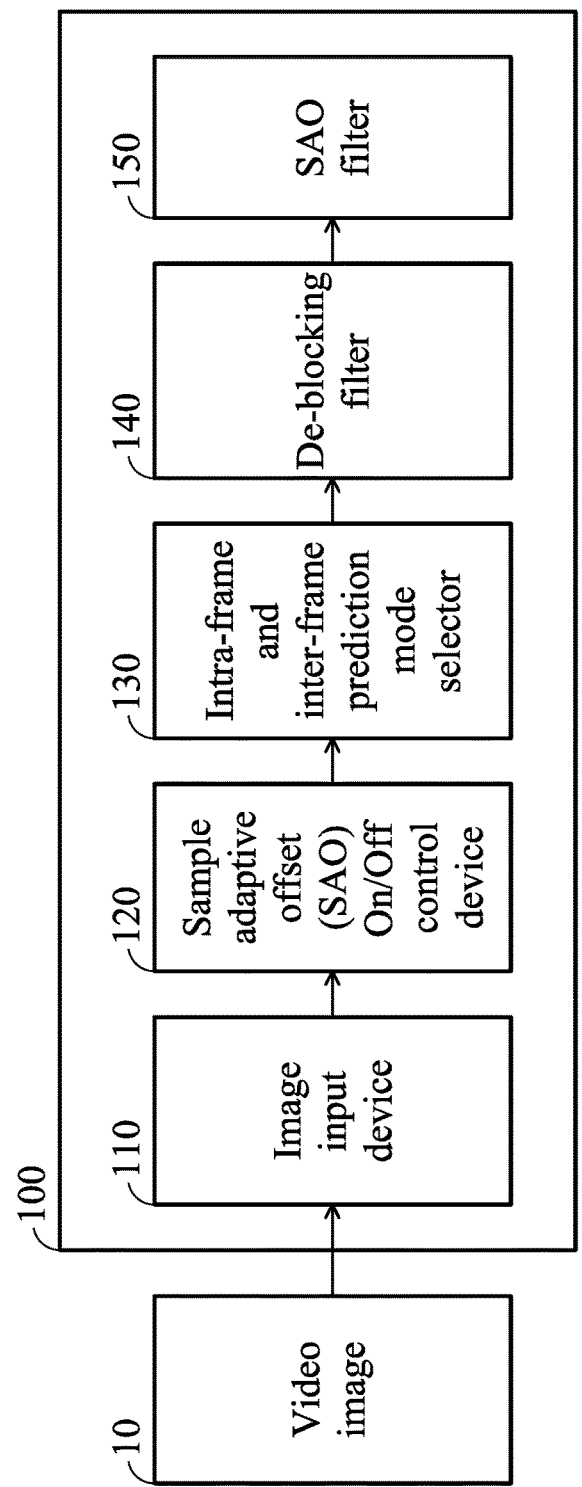
FIG. 1 is a schematic diagram of an image processing system according to an embodiment.

FIG. 1 is a schematic diagram of an image processing system according to an embodiment. As shown in FIG. 1, the image processing system 100 includes at least an image input device 110, an SAO On/Off control device 120, an intra-frame and inter-frame prediction mode selector 130, a de-blocking filter 140, and an SAO filter 150. The image input device 110 may be configured to receive or acquire an input image 10 and provide the input video image 10 to the SAO On/Off control device 120 for subsequent image analyzing and processing. For example, the image processing system 100 can be a laptop computer, a desktop computer, a tablet device, or other handheld device (e.g., a smartphone), but the invention is not limited thereto. For example, in an embodiment, the image input device 110 may be an image acquisition unit, such as one of an infrared image acquisition device, a Charge Coupled Device (CCD) element or Complementary Metal Oxide Semiconductor (CMOS) sensing element, or any combination thereof, and the invention is not limited thereto. The input image 10 may be a video image or a video stream and so on. Specifically, the input video image is to be divided into coding tree units (CTUs) of the same size before being coded, and then input to the encoder for coding. The CTUs are processing units of H.265/HEVC, including a Luma coding tree block (CTB), two Chroma CTBs and the corresponding syntax elements. For example, when the 4:2:0 sampling mode is used to select video images, the size of the Luma CTB is four times that of the Chroma CTB. The size of the CTU is defined within the Sequence Parameter Set (SPS), and the supported size within HEVC is L×L, where L=16, 32, or 64.

Figure 2:
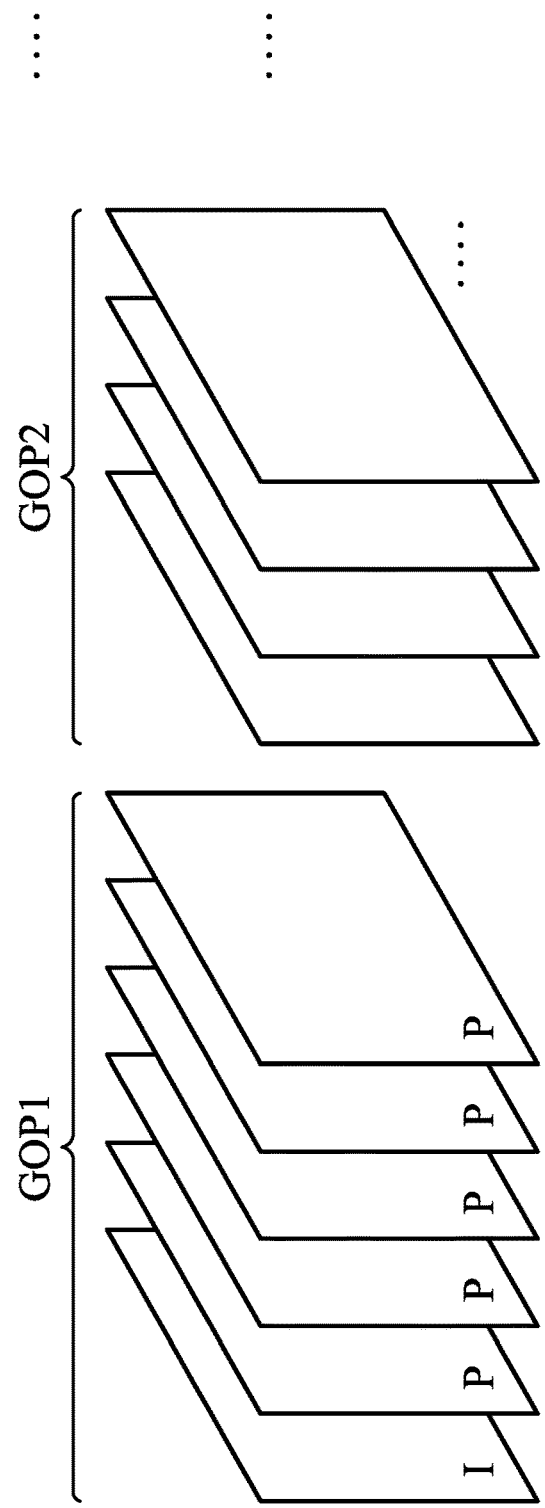
FIG. 2 is a schematic diagram illustrating an exemplary video image data according to an embodiment.

FIG. 2 is a schematic diagram illustrating an exemplary video image data according to an embodiment. As shown in FIG. 2, the video image 10 includes a sequence of video frames or images, and its plurality of consecutive video frames can be divided into a group of pictures (GOP). A GOP typically contains one or more of the series of video images in the video image. The GOP may contain the syntax data in the header of the GOP, in the headers of one or more than one images or in other places. The syntax data describes the number of images included in the GOP. Each of the blocks of an image can include the block syntax data describing the coding mode for each of the blocks. An intra picture frame (I-frame), a predictive frame (P-frame) and a bi-directional prediction frame (B-frame) are specified for each frame in the GOP. For example, as shown in FIG. 2, the sequence of a GOP may be IPPPPP, but the invention is not limited thereto. In one embodiment, a GOP can contain only one I-frame. In another embodiment, a GOP can contain two or more I-frames. The intra picture frame, also known as I frame, is usually the first frame of each GOP, and a moderately compressed I-frame can act as a reference point for random access and can be used as an image. The I-frame can be referred to as a product of image that has been compressed. A predictive frame, also known as P-frame, is a video frame that is used to compress the coded image of the transmitted data amount by sufficiently using the time redundancy information for previously encoded frames with lower order in the image sequence, which is also referred to as a prediction frame. The bi-directional prediction frame, also known as the B-frame, is a video frame that is used to compress the coded image of the transmitted data amount by using the time redundancy information between the previously encoded frames in the source image sequence and the time redundancy information of following frames in the source image sequence, which is also referred to as a bi-directional predicted frame. Decoding an I-frame does not depend on any other frames and it can be decompressed by a video decompression algorithm into a single complete picture by itself. However, decoding a P-frame depends on the I-frame or P-frame before it and decoding a B-frame depends on the nearest I-frame or P-frame before it and the nearest P-frame after it. The SAO On/Off control device 120 is connected to the image input device 110, which is a hardware circuit for receiving the input video image 10 and generating a control signal of the SAO filter 150 according to the type of the current frame when it is coded or decoded, to turn on or turn off the SAO filtering operation of the SAO filter 150. To be more specific, the SAO On/Off control device 120 may generate a first control signal to turn on the SAO filter 150, and the SAO On/Off control device 120 may also generate a second control signal to turn off the SAO filter 150. The main idea of SAO filtering is to classify the pixel features of the reconstructed image blocks according to the original image, apply different offset values to different classification, make it closer to the original image, and reduce the distortion of the reconstructed images, so as to achieve the effect of reducing image distortion. The SAO filter for each CTB can have two types of modes: Edge Offset (EO) or Band Offset (BO) modes. The difference between the two modes is the different classification methods for pixels. In the BO modes, all the pixels of each coding tree unit (CTU) are classified to the corresponding band according to their own pixel values, and the four consecutive bands are selected for SAO filtering. In the EO modes, the classification of current pixel needs to refer to its adjacent pixels. At the same time, EO modes can be divided into EO_0, EO_1, EO_2, and EO_3 modes according to the adjacent pixel selected by the current pixel. In EO_0 mode, the classification of pixels needs to refer to the values of their left and right adjacent pixels. In EO_1 mode, the classification of pixels needs to refer to the values of the adjacent pixels above and under them. In EO_2 mode, the classification of pixels needs to refer to the values of their upper left and lower right adjacent pixels. In EO_3 mode, the classification of pixels needs to refer to the values of their upper right and lower left pixels. In SAO, an offset value is added to each pixel according to the SAO type and category.

The intra-frame and inter-frame prediction mode selector 130 is connected to the SAO On/Off control device 120 for selecting an intra-prediction mode or an inter-frame prediction mode to perform a predictive encoding on each frame of the video image 10 so as to generate a reconstructed image. The deblocking (DBK) filter 140 is connected to the intra-frame and inter-frame prediction mode selector 130 for performing block-by-block filtering on the blocks of the reconstructed image that is generated after the predictive encoding to adaptively remove the block effect. The edges of the horizontal and vertical blocks in the prediction loop can be processed to reduce the block effect. The SAO filter 150 is connected to the de-blocking filter 140 to determine whether an SAO filtering operation is required to be performed on the deblocked result in accordance with the control signal for turning on or turning off from the SAO On/Off control device 120. The de-blocking filter 140 and the SAO filter 150 form a loop filter. To be more specific, as described above, the SAO On/Off control device 120 may generate a first control signal or a second control signal to turn on or off the SAO filter 150. When the SAO filter 150 receives the first control signal, the SAO filter 150 performs an SAO filtering operation, and when the SAO filter 150 receives the second control signal, the SAO filter 150 does not operate and does not perform the SAO filtering operation.

As described above, the SAO filter 150 is located after the de-blocking filter 140 within the codec loop filter, an SAO filtering operation may be performed to add an offset value to each pixel according to its SAO type and category, thereby making the reconstructed image closer to the original image and reducing the distortion between the original image and the reconstructed image.

Specifically, according to the coding structure selected by the GOP layer, I-frame, P-frame and B frame are specified for each frame in the GOP. If the sequence of a GOP is IBBPPP, the intra-frame and inter-frame prediction mode selector 130 makes an intra-frame prediction for the first frame (I-frame), and inter-frame prediction for P-frames and B-frames to generate predicted data. The predicted data is subtracted from the original video frames to obtain a predicted residual difference, which is then input into a transformation and quantization module (not shown). One sequence of the predicted residual difference data is transmitted to the entropy encoder (not shown) after the transformation and quantization, and the entropy coding is performed to form the binary coded stream. The dequantization and inverse transformation (not shown) is performed for the other sequence of the predicted residual difference data, and then added to the predicted data for performing operations of the de-blocking filter 140 and the SAO filter 150, to form a reference frame as a reference frame for inter-frame prediction.

In some embodiments, the image processing system may further include a storage device (not shown). The storage device may be a non-volatile storage medium (e.g., Read-Only Memory (ROM), Flash memory, magnetic tape, hard disk, or optical disc), or a volatile storage medium (e.g., Random Access Memory (RAM)), or any combination thereof for storing data, such as intermediate data generated during the calculation process and the result information and so on. The storage device may store the video image(s) 10 in advance, and the SAO On/Off control device 120 may directly access the input image(s) 10 from the storage device 130 for subsequent processing without passing through the image input device 110.

It could be understood that each of the elements or modules in the presented embodiments may be a device having a corresponding function, which may have the appropriate hardware circuits or elements to perform the corresponding function, however, the device is not limited to be entity device, which may also be a virtual device having program codes and software(s) with respective functions or a device having capabilities for processing and running the program codes and software(s). The manner of operations of the respective elements may further refer to the following description of the methods. Specifically, the image processing system 100 may control the operation of the SAO filter 150 via the SAO On/Off control device 120 to perform the control method of SAO filtering of the present invention. In the embodiments of the present invention, if the SAO filter 150 is selected to be turned on to perform the SAO filtering (operation) at the slice layer, the SAO filtering will be performed for all the I frames in one GOP by the SAO filter, and the SAO On/Off control device 120 can count a CTU ratio n of the CTUs being not performed with the SAO filtering in the current I frame to selectively turn off the SAO of subsequent frames in the current GOP. Turning on the SAO of I frame indicates that the I frame is first performed with a blocking filtering operation by the de-blocking filter 140 and then performed with an SAO filter operation through the SAO filter 150 during reconstructing the image, and turning off the SAO of the P frame indicates that the P frame is only performed with a blocking filtering operation by the de-blocking filter 140 without needing to performing with the SAO filter operation through the SAO filter 150 during reconstructing the image.

Figure 3:
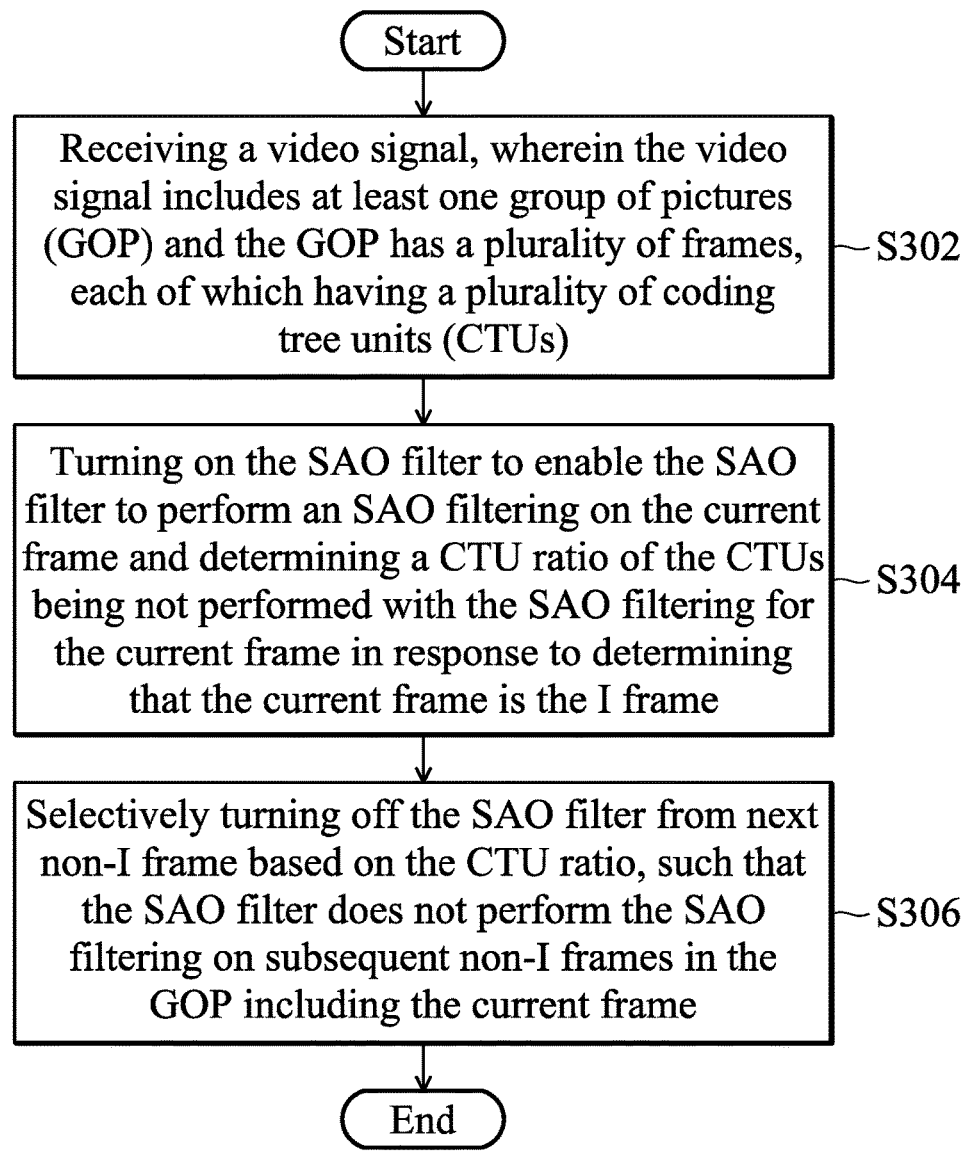
FIG. 3 is a flowchart of a control method of SAO filtering according to an embodiment.

FIG. 3 is a flowchart of a control method of SAO filtering according to an embodiment of the invention. Please refer together with FIG. 1 and FIG. 3. The control method of SAO filtering in accordance with the embodiments of the invention can be applied to an image processing system, for example, the image processing system 100 as shown in FIG. 1, and the method may be performed by the SAO On/Off control device 120.

First, in step S302, the SAO On/Off control device 120 receives a video signal, wherein the video signal includes at least one GOP and the GOP has a plurality of frames, each of the frames having a plurality of coding tree units (CTUs). In this step, the SAO On/Off control device 120 may receive a video signal, which includes a sequence of video frames or images, from the input video device 10, wherein multiple consecutive video frames may be divided into a GOP, each frame being divided into multiple CTUs of equal size (e.g., a size of 64×64).

The SAO On/Off control device 120 then processes each frame of the received video signal in units of GOP and determines whether to turn on or turn off the SAO filter according to whether current frame (i.e., the video frame currently processed) is an I frame or a non-I frame. For example, it is assumed that the current GOP includes a sequence of I frames and P frames, and the current frame may be I frame or a non-I-frame (i.e., P frame).

In step S304, the SAO On/Off control device 120 turns on the SAO filter 150 in response to determining that the current frame is the I frame to enable the SAO filter 150 to perform an SAO filtering on the current frame and determine a CTU ratio of the CTUs being not performed with the SAO filtering for the current frame. In some embodiments, the CTU ratio may be obtained by counting the number of CTUs whose offset values corresponding to the SAO filtering are zero in all the CTUs of the current frame. Specifically, when the SAO filter 150 is being turned on by the SAO On/Off control device 120 to perform the SAO filtering on the current I frame, some offset values are generated based on the SAO type and the class of the pixels in each CTU in the current I frame. If these offset values of a specific CTU are zero, it means that the specific CTU does not need to perform the SAO filtering. Accordingly, the SAO filter 150 will not perform the SAO filtering on this CTU, so the CTU does not perform the SAO filtering. Therefore, the CTU ratio of the CTUs that do not perform with the SAO filtering in the CTUs of the current frame can be determined by counting the number of CTUs whose offset values corresponding to the SAO filtering are zero in the current frame and comparing it to the total number of CTUs in the current frame.

Next, in step S306, the SAO On/Off control device 120 selectively turns off the SAO filter 150 from next non-I frame based on the CTU ratio obtained in step S304, such that the SAO filter 150 does not perform the SAO filtering on subsequent non-I frames in the GOP including the current frame. In some embodiments, the step of selectively turning off the SAO filter 150 from next non-I frame based on the CTU ratio such that the SAO filter 150 does not perform the SAO filtering on subsequent non-I frames in the GOP including the current frame may comprise: determining whether the CTU ratio is greater than a threshold value; when the CTU ratio is less than or equal to the threshold value, the SAO On/Off control device 120 continues to turn on the SAO filter 150, thereby enabling the SAO filter 150 to perform the SAO filtering on subsequent non-I frames (e.g., P frames) in the GOP; and when the CTU ratio is greater than the threshold value, it turns off the SAO filter such that the SAO filter does not perform the SAO filtering on the subsequent non-I frames in the GOP. Specifically, as described above, if an I frame is being performed with the SAO filtering and relatively fewer CTUs of the frame are selected for SAO after the SAO mode selection, it is not necessary to turn on the SAO for subsequent non-I frames. Accordingly, the SAO On/Off control device 120 can automatically turn off the SAO filter 150 of the subsequent non-I frames when relatively fewer CTUs of I-frame are selected for SAO, so that when the subsequent non-I frame (e.g., P frame) of the current GOP is being processed, the SAO filter 150 will not perform the SAO filtering on these non-I frames, thereby eliminating the coding process corresponding to SAO syntax elements and reducing the time complexity of coding.

In addition, since a scene switch may occur in one GOP, the SAO filter 150 should be turned on again if a scene switch occurs, so that the SAO On/Off control device 120 can further detect the scene switch and turn on the turned-off SAO filter 150 in time. For the I frame, once the SAO filter 150 on the sequence layer is turned on, the SAO filter 150 on the slice layer is always turned on, so the SAO On/Off control device 120 can determine whether the current frame is an I-frame and self-adaptively turn on the turned-off SAO filter. In some embodiments, after turning off the SAO filter 150, the SAO On/Off control device 120 can further determine whether the next frame to be processed in the current GOP is an I-frame and turn on the SAO filter 150 in response to determining that the next frame to be processed in the current GOP is the I-frame. After the SAO filter 150 is turned on again, it will perform the SAO filtering on the frame to be processed and re-determine the CTU ratio of the CTUs of the frame to be processed that have not undergone the SAO filtering, and selectively turn off the SAO filter 150 according to the CTU ratio, such that the SAO filter does not perform the SAO filtering on the I-frames following the frame to be processed in the GOP.

Figure 4:
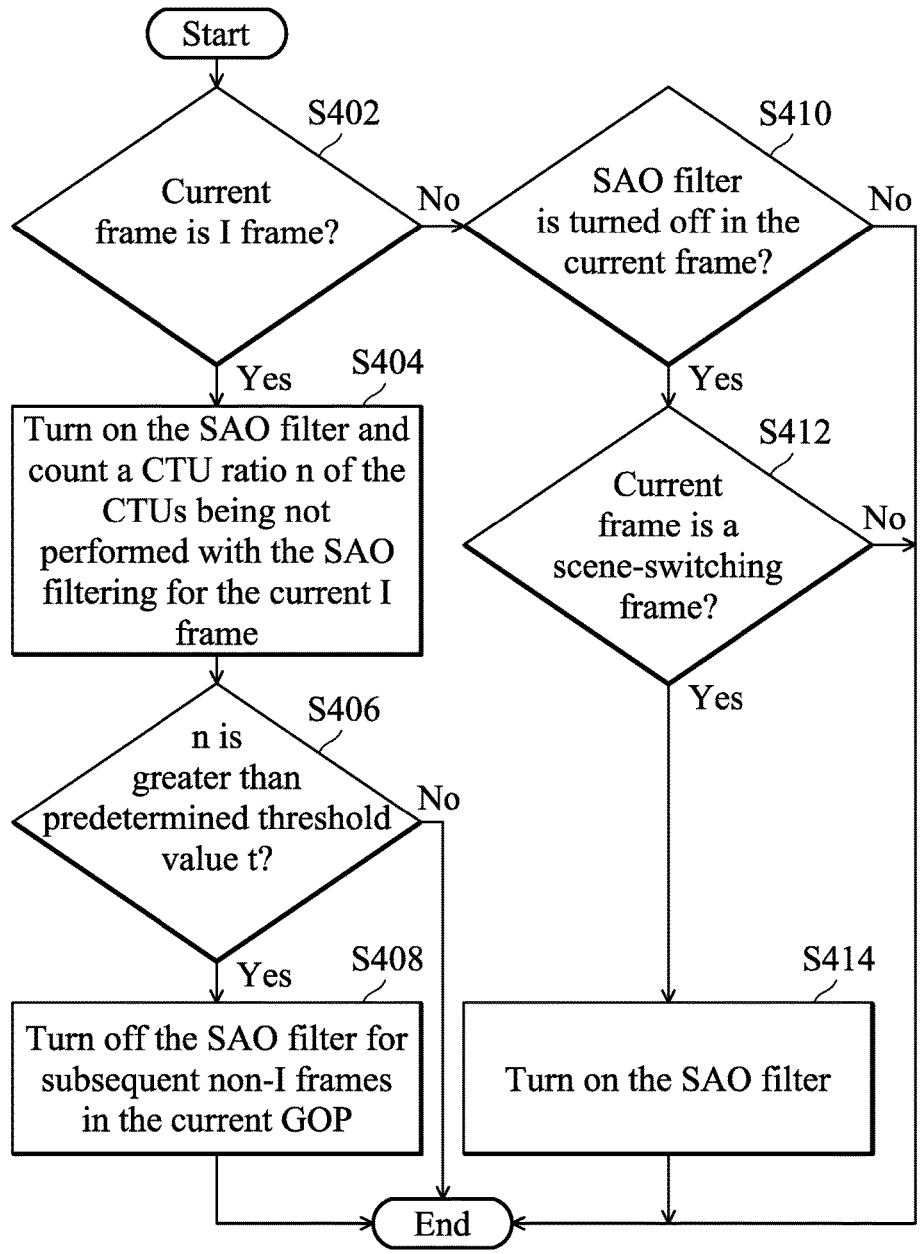
FIG. 4 is a flowchart of a control method of SAO filtering according to another embodiment.

FIG. 4 is a flowchart of a control method of SAO filtering according to another embodiment of the invention. Please refer together with FIG. 1 and FIG. 4. The control method of SAO filtering in accordance with the embodiments of the invention can be applied to an image processing system, for example, the image processing system 100 as shown in FIG. 1, and the method may be performed by the SAO On/Off control device 120.

First, the SAO On/Off control device 120 determines whether the current frame is an I frame (step S402). For example, assuming that the current GOP includes a sequence of I-frames and P-frames, the current frame may be an I-frame or a non-I-frame (i.e., P-frame). When the current frame is an I frame, the SAO On/Off control device 120 turns on the SAO filter 150 and counts a CTU ratio n of the CTUs being not performed with the SAO filtering for the current I frame (step S404). In some embodiments, the counting of the CTU ratio n of the CTUs being not performed with the SAO filtering for the current I frame is determined based on the offset values of the SAO mode selection (e.g., E0 or B0 mode) for each CTU in the current I frame. If all the offset values are zero for a specific CTU, then it is determined that the specific CTU did not perform the SAO.

Next, the SAO On/Off control device 120 determines whether the CTU ratio n of the CTUs being not performed with the SAO filtering for the current I frame is greater than the predetermined threshold value t (step S406). For example, assuming that the resolution of a frame is 4K (4096*2160 pixels) and the size of the CTU is 64*64 pixels, there are about 2160 CTUs in the current frame. When the threshold value t is set to 0.8, determining whether the CTU ratio n of the CTUs being not performed with the SAO filtering for the current I frame is greater than the predetermined threshold value t is to count whether the number of CTUs whose offset values are all zero is greater than 1728 CTUs. Assuming that there are more than 1728 CTUs (for example, 1800 CTUs) among the 2160 CTUs in the current I frame that have not perform with the SAO filtering, the SAO On/Off control device 120 determines that the ratio n of the CTUs being not performed with the SAO filtering for the current I frame to the total CTUs in the current I-frame is greater than the threshold value t. Similarly, assuming that there are less than 1728 CTUs (for example, 1500 CTUs) among 2160 CTUs in the current I frame that have not perform with the SAO filtering, the SAO On/Off control device 120 determines that the ratio n of the CTUs being not performed with the SAO filtering to the total CTUs in the current I frame is not greater than the threshold value t.

If the CTU ratio n of the CTUs being not performed with the SAO filtering for the current I frame is less than or equal to the threshold value t (No in step S406), the SAO On/Off control device 120 continues to turn the SAO filter on, and the flow ends. If the CTU ratio n of the CTUs being not performed with the SAO filtering for the current I frame is greater than the threshold value t (Yes in step S406), the SAO On/Off control device 120 turns off the SAO filter 150 at the slice layer for subsequent non-I frames in the current GOP (step S408). That is, the subsequent non-I frames (such as P frames) in the current GOP will not perform the SAO filtering. Since the subsequent non-I frames do not need SAO filtering, the coding for the SAO syntax elements of these non-I frames can be reduced, thereby saving the code rate.

In addition, if a scene switch occurs, the SAO filter being turned off should be turned on again. Accordingly, the SAO On/Off control device 120 needs to detect whether the current non-I frame is a scene-switching frame and, if so, turns on the SAO filter 150 which has been turned off. If the current non-I frame is not the scene-switching frame, the SAO On/Off control device 120 keeps turning off the SAO filter 150.

If the current frame is a non-I frame (for example, a P frame) (No in step S402), the SAO On/Off control device 120 then determines whether the SAO filter 150 has been turned off in the current frame (step S410). If the current frame does not turn off the SAO filter 150, the SAO On/Off control device 120 does not need to control the SAO filter 150, and the flow ends. If the SAO filter 150 has been turned off in the current frame, the SAO On/Off control device 120 then determines whether the current frame is a scene-switching frame (step S412). In some embodiments, the SAO On/Off control device 120 may determine whether the current frame is a scene-switching frame based on whether the luminance mean difference between the two frames which are frames before and after the current frame in the GOP is greater than a threshold value. For example, assuming that the threshold value is set to 10, the SAO On/Off control device 120 determines that the current frame is the scene-switching frame when the luminance mean difference of these two frames is greater than 10 while it determines that the current frame is not a scene-switching frame when the luminance mean difference of the two frames is less than 10.

In other embodiments, because the DCT coefficients of each frame in the same scene would maintain a relatively continuous state, these values changes greatly before and after the scene shift due to the time continuity of the image that has been broken. Therefore, the SAO On/Off control device 120 can determine whether the current frame is a scene-switching frame according to whether the change of DCT coefficients of the frames is greater than a threshold value. It should be understood that the above-described method of determining whether the current frame is a scene-switching frame is for illustrative purposes only and is not intended to limit the invention. Any other methods or means which may be used to determine the scene-switching frame can also be applied to the present invention.

If the SAO filter 150 is turned off in the current frame and the current frame is not the scene-switching frame (No in step S412), which means that the SAO filter 150 is no need to be controlled, the SAO On/Off control device 120 continues to turn off the SAO filter 150 and the flow ends. When the SAO filter 150 is turned off in the current frame and the current frame is the scene-switching frame (Yes in step S412), the SAO On/Off control device 120 turns on the SAO filter that has been turned off (step S414), and the flow ends.

For example, assuming that the sequence of the current GOP is IPPPI, as the first frame is an I frame, the SAO On/Off control device 120 turns on the SAO filter 150 to perform the SAO filtering and counts the CTU ratio n of the CTUs being not performed with the SAO filtering for the current I frame. In this embodiment, it is assumed that the current I frame is a full black screen picture and 4000 CTUs are included in the I frame. As all the 4000 CTUs do not perform the SAO filtering, the CTU ratio n of the CTUs being not performed with the SAO filtering is 1, which is greater than the threshold value of 0.8, so that the SAO On/Off control device 120 turns off the SAO filter 150 for subsequent non-I-frames in the current GOP at the slice layer. When the second frame and the third frame continue to be processed, as the second frame and the third frame are P frames and are not scene-switching frames, the SAO filter 150 is turned off at this time, so that the SAO filter 150 does not need to perform the SAO filtering on the second frame and the third frame. When the fourth frame is being processed, as the fourth frame is P frame and is the scene-switching frame, the SAO On/Off control device 120 turns the SAO filter 150 on again so that the SAO filter 150 performs the SAO filtering on the fourth frame. When the fifth frame is continuously being processed, as the fifth frame is an I frame, the SAO On/Off control device 120 turns on the SAO filter 150 and counts the CTU ratio n of the CTUs being not performed with the SAO filtering for the current I frame and then determines whether the SAO filter 150 needs to be turned off according to a comparison result of the CTU ratio n and the threshold value t.

Therefore, according to image processing systems and associated control methods of SAO filtering of the present invention, the SAO filter can be selectively turned on or turned off based on the characteristics of each reference frame in the input video image and the ratio of CTUs that have undergone SAO to the total CTUs, which can be used to reduce the time complexity of coding and coding requirements of SAO syntax elements for some videos with large resolution and relatively fewer CTUs performing SAO filtering in reference frame without affecting the effect of the traditional SAO technique that improves the quality of coding, thus effectively saving code rate.

Systems and method thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A control method of sample adaptive offset (SAO) filtering applied to an image processing system with an SAO filter, comprising:

receiving a video signal, wherein the video signal includes at least one group of picture (GOP) and the GOP has a plurality of frames, each of which having a plurality of coding tree units (CTUs);

determining whether current frame is an intra-picture frame (I frame);

turning on the SAO filter to enable the SAO filter to perform an SAO filtering on the current frame and determining a CTU ratio of the CTUs being not performed with the SAO filtering for the current frame in response to determining that the current frame is the I frame; and selectively turning off the SAO filter from next non-I frame based on the CTU ratio, such that the SAO filter does not perform the SAO filtering on subsequent non-I frames in the GOP including the current frame.

2. The control method of SAO filtering of claim 1, wherein the step of selectively turning off the SAO filter starting from next non-I frame based on the CTU ratio, such that the SAO filter does not perform the SAO filtering on subsequent non-I frames in the GOP including the current frame further comprises:
determining whether the CTU ratio is greater than a threshold value;
enabling the SAO filter to perform the SAO filtering on subsequent non-I frames in the GOP when the CTU ratio is less than or equal to the threshold value; and
turning off the SAO filter such that the SAO filter does not perform the SAO filtering on the subsequent non-I frames in the GOP when the CTU ratio is greater than the threshold value.

3. The control method of SAO filtering of claim 1, further comprising:
determining whether the SAO filter is being turned off in response to determining that the current frame is the non-I frame;
determining whether the current frame is a scene-switching frame in response to determining that the SAO filter is turned off; and
turning on the SAO filter in response to determining that the current frame is the scene-switching frame.

4. The control method of SAO filtering of claim 3, wherein the determination of whether the current frame is the scene-switching frame is made according to a comparison result of a luminance mean difference between the two frames which are frames before and after the current frame in the GOP and a threshold value.

5. The control method of SAO filtering of claim 1, further comprising:
after turning off the SAO filter, turning on the SAO filter in response to determining that the subsequent frame to be processed in the GOP is the I frame to enable the SAO filter to perform the SAO filtering on the frame to be processed, determine a CTU ratio of the CTUs being not performed with the SAO filtering for the frame to be processed, and selectively turn off the SAO filter based on the CTU ratio, such that the SAO filter does not perform the SAO filtering on non-I frames subsequent to the frame to be processed in the GOP.

6. The control method of SAO filtering of claim 1, wherein the CTU ratio is obtained by counting the number of CTUs whose offset values corresponding to the SAO filtering are all zero in the CTUs of the current frame.

7. The control method of SAO filtering of claim 6, wherein the non-I frame comprises a predictive frame (P-frame).

8. An image processing system, comprising:
an image input device, obtaining a video signal, wherein the video signal includes at least one group of picture (GOP) and the GOP has a plurality of frames, each of which having a plurality of coding tree units (CTUs);
a sample adaptive offset (SAO) On/Off control device connected to the image input device;
a de-blocking filter coupled to the SAO On/Off control device; and
an SAO filter connected to the de-blocking filter for performing an SAO filtering,
wherein the SAO On/Off control device receives the video signal, determines whether current frame is an intra-picture frame (I frame), turns on the SAO filter to enable the SAO filter to perform the SAO filtering on the current frame and determines a CTU ratio of the CTUs being not performed with the SAO filtering for the current frame in response to determining that the current frame is the I frame, and selectively turns off the SAO filter from next non-I frame based on the CTU ratio, such that the SAO filter does not perform the SAO filtering on subsequent non-I frames in the GOP including the current frame.

9. The image processing system of claim 8, wherein the SAO On/Off control device further determines whether the CTU ratio is greater than a threshold value, enables the SAO filter to perform the SAO filtering on subsequent non-I frames in the GOP when the CTU ratio is less than or equal to the threshold value, and turns off the SAO filter such that the SAO filter does not perform the SAO filtering on the subsequent non-I frames in the GOP when the CTU ratio is greater than the threshold value.

10. The image processing system of claim 8, wherein the SAO On/Off control device further determines whether the SAO filter is being turned off in response to determining that the current frame is the non-I frame, determines whether the current frame is a scene-switching frame in response to determining that the SAO filter is turned off, and turns on the SAO filter in response to determining that the current frame is the scene-switching frame.

11. The image processing system of claim 8, wherein the SAO On/Off control device further determines whether the current frame is the scene-switching frame by a comparison result of a luminance mean difference between the two frames which are frames before and after the current frame in the GOP and a threshold value.

12. The image processing system of claim 8, wherein the SAO On/Off control device further determines, after turning off the SAO filter, turns on the SAO filter in response to determining that the subsequent frame to be processed in the GOP is the I frame to enable the SAO filter to perform the SAO filtering on the frame to be processed, determine a CTU ratio of the CTUs being not performed with the SAO filtering for the frame to be processed, and selectively turn off the SAO filter based on the CTU ratio, such that the SAO filter does not perform the SAO filtering on non-I frames subsequent to the frame to be processed in the GOP.

13. The image processing system of claim 8, wherein the SAO On/Off control device further obtains the CTU ratio of the CTUs being not performed with the SAO filtering for the current frame by counting the number of CTUs whose offset values corresponding to the SAO filtering are all zero in the CTUs of the current frame.

14. The image processing system of claim 8, further comprising an intra-frame and inter-frame prediction mode selector configured between the SAO On/Off control device and the deblocking filter for selecting an intra-frame prediction mode or an inter-frame prediction mode for each of the frames of the video signal to carry out a predictive coding.

* * * * *